(No Model.)

T. H. COMSTOCK & J. E. JUNK.
SAWMILL DOG.

No. 489,287. Patented Jan. 3, 1893.

Witnesses
L. C. Hills
E. H. Wick

Inventors
Thomas H. Comstock,
John E. Junk.
By Ernest C. Webb Attorney

UNITED STATES PATENT OFFICE.

THOMAS H. COMSTOCK AND JOHN E. JUNK, OF NASHVILLE, TENNESSEE.

SAWMILL-DOG.

SPECIFICATION forming part of Letters Patent No. 489,287, dated January 3, 1893.

Application filed May 18, 1892. Serial No. 433,427. (No model.)

*To all whom it may concern:*

Be it known that we, THOMAS H. COMSTOCK and JOHN E. JUNK, citizens of the United States, and residents of Nashville, in the county of Davidson and State of Tennessee, have invented certain new and useful Improvements in Sawmill-Dogs, of which the following is a specification.

This invention relates to certain new and useful improvements in saw-mill dogs, and has for its object the production of a dog which will firmly grip the log from above and below and hold said log squarely against the knees of the head and tail blocks, but yet be capable of a certain vertical motion so that if knots or other inequalities are encountered during the sawing operation, which would cause said log to drop as set out to the saw, the dog will follow the log down and allow the weight to rest upon the head block.

A further object is to make the dogs readily adjustable both vertically and horizontally, to adapt said dogs not only to the different thickness of the logs, but also to different widths as the boards are sawed off.

To this end our invention consists in the details of construction and the combination and arrangement of parts, all as hereinafter more particularly described and set forth in the claims.

Figure 1:
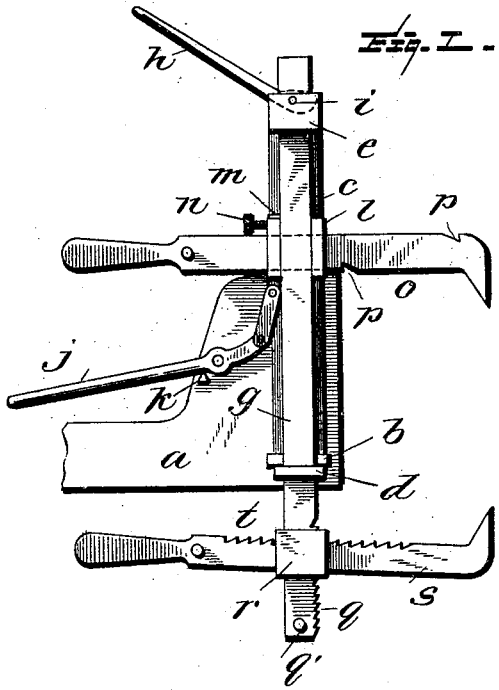
Figure 2:
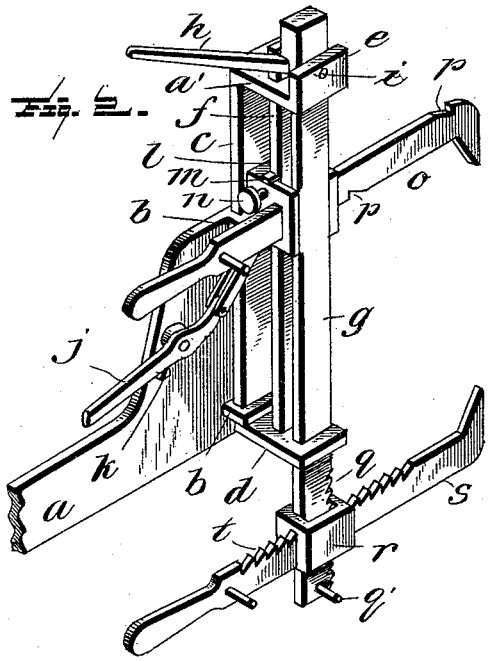

In the accompanying drawings, illustrating our said invention, in the figures of which like parts are similarly designated: Figure 1, is a side view; and Fig. 2, a perspective view showing the dog in position to be operated.

$a$, is the knee of an ordinary head block, having secured thereto the lateral flanges, lugs or guides, $b$, through which works a vertically sliding frame, comprising a back portion or strip $c$, the laterally projecting portions or wings $d$, and $d'$, the wing $d'$ being provided with the vertically flanged lug $e$. Secured to the wing or projection $d$, and passing upwardly through the wing $d'$, is the upright or guide $f$, upon which the upper dog slides and is adjusted, as hereinafter explained and through slots or grooves in the wings $d$, $d'$, works the strip or "sliding bar" $g$, flanged at its upper end, as shown, and capable of being vertically operated to a limited extent by the cam-lever $h$, secured in place by the pin $i$, passing through the flange $e$, a slot in the "sliding bar" $g$, the cam-lever $h$, and the projecting end of the upright or guide $f$. To the knee $a$, is pivoted the compound lever $j$, pivotally secured at its end to the portion $c$, of the sliding frame, thereby giving an extended vertical movement to the entire apparatus, the movement of said lever $j$, being limited by an appropriate stop $k$. It will be apparent that parts $c$ and $f$, maintain a certain fixed relation to each other through all manipulations of the device, while the part $g$, is capable of independent vertical movement for a purpose hereinafter explained.

Working over the guide $f$, is the loose sleeve $l$, extended as shown, to embrace the sides of the "sliding bar" $g$, and adjustably secured to guide $f$, by the friction surface $m$, and the set screw $n$. The dog $o$, is loosely held in the extension of the sleeve $l$, and is provided with the upper and lower notches $p$, engaging the upper or lower side of the channel through sleeve $l$, to hold said dog in any desired position. As shown, the projecting lower end of "sliding bar" $g$, is provided with the upwardly projecting teeth or notches $q$, in one or another of which the loose sleeve $r$, is engaged, while the stop $g'$, limits the downward travel of said sleeve. The lower dog $s$, as shown, passes loosely through appropriate grooves or channels in the sleeve $r$, and is provided with a series of teeth or notches $t$, which, engaging one side of said sleeve $r$, permit the adjustment of said dog in and out. It is desirable to provide the lower dog $s$, with a greater number of such teeth or notches than the upper dog $o$, as in use the under dog is usually projected further than the upper dog, and the "grip" is oblique instead of perpendicular, and, as the boards are sawed off, it is only necessary to move inwardly the under dog from time to time until the "grip" is nearly perpendicular, when the upper dog is given another notch, which may be a considerable distance from the first.

The operation of our device is as follows:—
The log is brought into position, and the dogs $o$, and $s$, are moved back or forth through sleeves $l$, and $r$, to the desired position; when the upper dog $o$, is raised with its friction sleeve $l$, several notches above the log, and is then held in such position by the set screw $n$, and friction surface $m$, binding against the guide $f$. The compound lever $j$, is then tripped, dropping all of the movable parts, the sliding frame passing downwardly through the lugs $b$, and the weight of the apparatus drives the upper dog $o$, into the log, binding it in its sleeve $l$, in its adjusted position. The cam-lever $h$, is then pulled downwardly, raising the "sliding bar" $g$, and with it the lower dog $s$, forcing the latter into the log from below, and as said dog fits loosely in its sleeve $r$, the opposite end is raised sufficiently for a tooth or notch $t$, to engage the side of said sleeve $r$, thereby holding said dog in its adjusted position. The log is thus securely gripped both from above and below, and is held squarely against the knee of the head block, and as the log is fed to the saw, if knots, depressions or other inequalities are encountered, which would cause said log to raise or drop as set out to the saw, the sliding frame carrying the dogs moves up or down through lugs or guides $b$, allowing the weight of the log to rest upon the head and tail blocks, at the same time holding the log squarely against the knees of said head and tail blocks. As the horizontal diameter of the log is reduced by the sawing away of the boards, the cam-lever $h$, is raised thereby releasing the under dog $s$, which may be pulled inwardly one or more notches, as desired, and this operation is repeated until the "grip," of the upper and lower dogs is approximately perpendicular, when, as before, the cam-lever $h$, is raised, releasing the under dog $s$, and the compound-lever $j$, is pulled downwardly, raising the sliding frame, and with it the upper dog $o$, the dogs are again adjusted, and the levers manipulated as before, again securely gripping the log.

It will be apparent from the foregoing, that as the dogs $o$, and $s$, are secured in the same frame, by raising or lowering the lever $j$, the same vertical travel is given to both the upper and lower dogs, while the lower dog, having a slight independent vertical movement, is drawn up to grip the log, after the upper dog is fastened therein.

What we claim as new and desire to secure by Letters Patent, is:—

1. In a saw mill dog, the combination with a vertically sliding frame, and means for operating the same, a fixed upright guide, to which the upper dog is adjustably attached, secured in said frame, and a sliding bar projecting above and below said frame, and working in guides therein, said bar being capable of a slight independent motion, and carrying at its lower projecting end an adjustably secured lower dog, substantially as described.

2. In a saw mill dog, slotted lugs or guides secured to the head block knees, a strip or rod working in said guides and provided with upper and lower wings, affording supports for a fixed guide to which the upper dog is adjustably secured, and also affording bearings or guides for an independent vertically "sliding bar" to which the lower dog is adjustably secured, a cam-lever for imparting said independent vertical movement to the said "sliding bar," and a compound lever for vertically moving the entire structure, substantially as described.

3. A vertical "sliding bar" working through guides in a vertically movable supporting frame, said "sliding bar" being provided with a number of upwardly inclined teeth or notches, at its lower end, in combination with a loose sleeve surrounding said link engaging said teeth or notches and affording a support for a saw mill dog and a cam-lever operating upon a suitable flange at the upper end of said "sliding bar" to impart an independent vertical movement to said "sliding bar," sleeve and dog relatively to the said supporting frame, substantially as described.

Signed at Nashville, in the county of Davidson and State of Tennessee, this 16th day of April, A. D. 1892.

THOMAS H. COMSTOCK.
JOHN E. JUNK.

Witnesses:
C. B. BENEDICT,
J. K. JUNK.